US006694304B1

United States Patent
Sethi

(10) Patent No.: US 6,694,304 B1
(45) Date of Patent: Feb. 17, 2004

(54) SYSTEM AND METHOD FOR RETRIEVING NETWORK MANAGEMENT TABLE ENTRIES

(75) Inventor: Aseem Sethi, Cox Town (IN)

(73) Assignee: Cisco Technology, San Jose, CA (US)

( * ) Notice: Subject to any disclaimer, the term of this patent is extended or adjusted under 35 U.S.C. 154(b) by 0 days.

(21) Appl. No.: 09/506,528

(22) Filed: Feb. 17, 2000

(51) Int. Cl.[7] .............................................. G06F 17/30
(52) U.S. Cl. ............................... 707/2; 709/238; 707/3
(58) Field of Search ................................. 709/223, 224, 709/232, 202, 238, 23; 707/103 R, 1–3, 200, 10

(56) References Cited

U.S. PATENT DOCUMENTS

| | | | | | |
|---|---|---|---|---|---|
| 5,509,123 | A | * | 4/1996 | Dobbins et al. | 370/254 |
| 5,706,508 | A | * | 1/1998 | Chen et al. | 707/1 |
| 5,751,971 | A | * | 5/1998 | Dobbins et al. | 709/238 |
| 5,787,437 | A | * | 7/1998 | Potterveld et al. | 707/100 |
| 5,923,850 | A | * | 7/1999 | Barroux | 709/223 |

OTHER PUBLICATIONS

RFC 1213, "Management Information Base for Network Management of TCP/IP–based Internets: MIB–II"; Internet Engineering Task Force, Mar. 1991.

RFC 1155, "Structure and Identification of Management Information for TCP/IP–based Internets"; Internet Engineering Task Force, May 1990.

RFC 2572, "Message Processing and Dispatching for the Simple Network Management Protocol"; Apr. 1999.

RFC 1157, "A Simple Network Management Protocol (SNMP)"; Internet Engineering Task Force, May 1990.

RFC 1448, "Simple Network Management Protocol"; Internet Engineering Task Force, Apr. 1993.

* cited by examiner

Primary Examiner—Jean R. Homere
Assistant Examiner—Mohammad Ali
(74) Attorney, Agent, or Firm—Ritter, Lang & Kaplan LLP

(57) ABSTRACT

Systems and methods for retrieving table entries within a network management system are provided. A method includes receiving a request for table entries which are identified by an object identifier having a plurality of elements. The request includes at least one table entry object identifier and an index identifying at least one element of the object identifier. The method further includes varying the index element in the table entry object identifier and sending a response to the management station. The response includes the table entries obtained by varying the index element.

15 Claims, 7 Drawing Sheets

SYSTEM AND METHOD FOR RETRIEVING NETWORK MANAGEMENT TABLE ENTRIES

BACKGROUND OF THE INVENTION

The present invention relates generally to network management, and more particularly, to retrieval of table entries from a management information database.

It is desirable to manage and control nodes of a network such as a TCP/IP network from one or more network management stations connected to the network. The network management stations monitor and control other nodes in the network including hosts, routers, etc. A protocol known as the Simple Network Management Protocol (SNMP) is used to communicate management information between network management stations and management agent software operating on other network nodes. SNMP is described in Case, RFC 1157, "A Simple Network Management Protocol (SNMP), (Internet Engineering Task Force May 1990), the contents of which are incorporated by reference herein. Using SNMP in a TCP/IP network, a network management station may monitor traffic at a remote node and modify network operation parameters at the remote node.

To facilitate SNMP operation, nodes of a TCP/IP network including the network management stations maintain network management information databases known as MIBs (management information bases). MIBs are described in McCloghrie, et al., RFC 1213, "Management Information Base for Network Management of TCP/IP Based Internets: MIB-II" (Internet Engineering Task Force March 1991), the contents of which are incorporated by reference herein.

The MIB at each node consists of many individual objects, each having a single value. For example, a particular node may include within its MIB an object whose value specifies the total number of IP datagrams received at that node, including those received in error. The MIB at the network management station may include an object specifying the time since the network management software at the station was last reinitialized. Each MIB includes a large number of such objects.

Each MIB object is specified by an object identifier (OID). The OID includes a number of elements which specify the type of object and a particular instance of that type. For example, an object whose value indicates the total number of input octets on an interface of a node is denoted by the OID 1.3.6.1.2.1.2.2.1.10.x, where x is an element that indicates a specific instance of the type identified by the values preceding x. In this case, x is just one integer and identifies a particular interface of the node storing the object referenced by the OID.

SNMP is a request-response protocol by which the variables of an agent's MIB may be inspected or altered. The protocol is described in RFC 1448, "Protocol Operations for Version 2 of the Simple Network Management Protocol", Case, McCloghrie, Rose & Waldbusser, April 1993, the contents of which are incorporated by reference herein. The management protocol provides for the exchange of messages which convey management information between the agents and management stations. The management station sends a request to an agent asking it for information or commanding it to update its state in a certain way. The agent typically replies with the requested information or confirms that it has updated its state as requested. Data is sent using the ASN. I transfer syntax described in RFC 1157, referenced above. Conventional message types include Get, GetNext, GetBulk, Set, Trap, and Inform. The Get operation is used by the system to retrieve the value of one or more object instances from an agent. The GetNext operation is used by the system to retrieve the value of the next object instance in a table or list within an agent. The GetBulk operation is used by the system to efficiently retrieve large blocks of data, such as large tables. The Set operation is used by the network management system to set the values of object instances within an agent. The trap operation is used by agents to asynchronously inform the network management system of a significant event. The Inform operation allows one network management system to send trap information to another network management system and receive a response.

The Get requests are generated by a protocol entity at the request of its SNMP application entity. For example, if the management station wants to receive multiple OIDs contained within a table, the management station will send multiple GetNext messages until there no additional entries in the table. For each GetNext request, the agent returns those objects that are next in the lexicographical ordering of the known object names. The GetNext response provides the name of the object, in the lexicographical ordering of the names of all objects available for get operations in the relevant MIB view, together with the value of the name field. If the management station wants to receive specific table entries such as all the elements of a table row indexed by a particular element (e.g., owner/name or Ethernet interface), the management station has to send multiple Get requests for a list of OIDs and put this information in a table form. One disadvantage of conventional Get requests is that the management station has to go through the table entries in lexicographical order and cannot vary a specific element. There is currently no efficient way to request and receive table entries indexed by a specific element.

There is, therefore, a need for a protocol data unit which can be used by a network management system to request and receive from a managed device database table entries indexed by a particular entry element.

SUMMARY OF THE INVENTION

Systems and methods for efficient retrieval of table entries are provided by virtue of the present invention.

According to one aspect of the invention, a computer-implemented method retrieves table entries identified by an object identifier having a plurality of elements. The method includes receiving a request for table entries, the request including at least one table entry object identifier and an index identifying at least one of the plurality of elements. The method further includes varying the index element in the table entry object identifier and sending a response including the table entries obtained by varying the index element.

A computer program product of the present invention generally comprises code that receives a request for table entries identified by an object identifier having a plurality of elements. The request includes at least one table entry object identifier and an index identifying at least one of the plurality of elements. The product further includes code that varies the index element in the table entry object identifier and sends a response including the table entries obtained by varying the index element. The product also includes a computer readable storage medium for storing the codes.

In another aspect of the present invention, a computer system comprises a processor that executes a program for retrieving table entries identified by an object identifier having a plurality of elements. The program includes code that receives a request for table entries. The request includes at least one table entry object identifier and an index identifying at least one of the plurality of elements. The program also includes code that varies the index element in the table entry object identifier and sends a response including the table entries obtained by varying the index element. The computer system further includes a computer readable medium having the program stored thereon.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

FIG. 5 depicts representative object identifiers.

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple nodes. Nodes of a network may be user workstations, servers, routers, etc. Certain nodes of the network may be network management stations used to monitor and control overall network operation.

Figure 1:
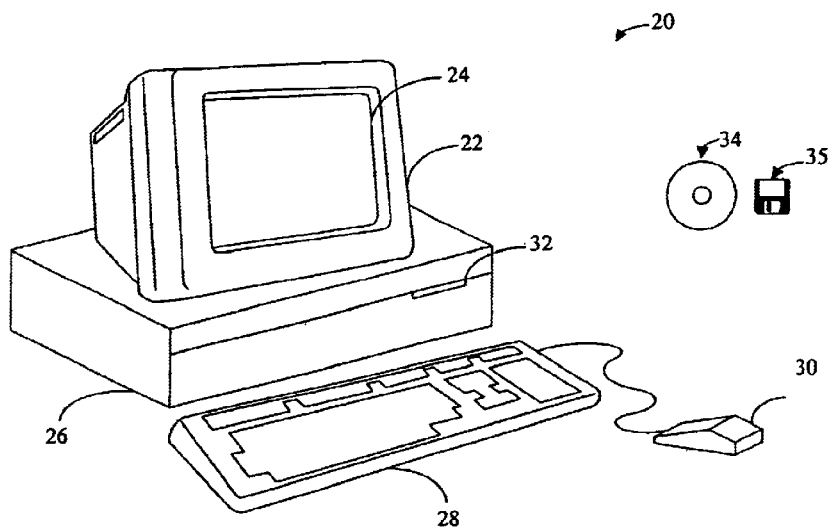
FIG. 1 is a schematic illustrating an example of a computer system that can be utilized to execute software of an embodiment of the present invention.

FIG. 1 illustrates an example of a computer system that may be used to execute software of an embodiment of the invention. The computer system 20 includes a display 22, screen 24, cabinet 26, keyboard 28, and mouse 30 which may include one or more buttons for interacting with a GUI (Graphical User Interface). Cabinet 26 houses a CD-ROM drive 32, system memory 42 and a hard drive 44 (see FIG. 2) which can be utilized to store and retrieve software programs incorporating computer code that implements aspects of the invention, data for use with the invention, and the like. Although CD-ROM 34 and floppy disk 35 are shown as exemplary computer readable storage media, other computer readable storage media including tape, flash memory, system memory, and hard drive may be utilized. Additionally, a data signal embodied in a carrier wave (e.g., in a network including the Internet) may be the computer readable storage medium.

Figure 2:
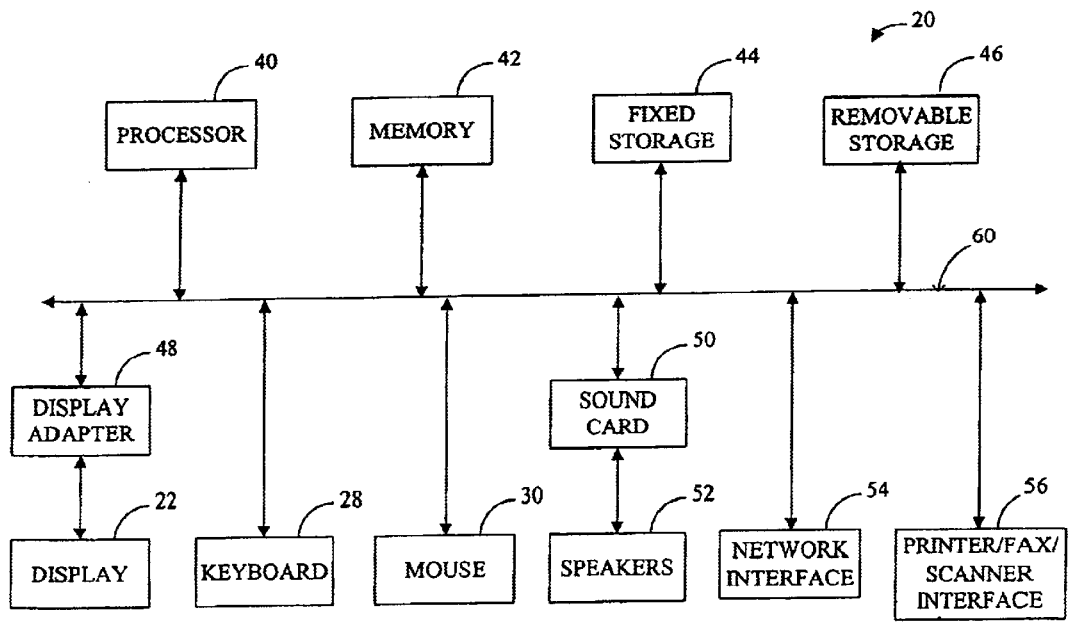
FIG. 2 is a system block diagram of the computer system of FIG. 1.

FIG. 2 shows a system block diagram of computer system 20 used to execute software of an embodiment of the invention. Computer system 20 further includes subsystems such as a central processor 40, system memory 42, fixed storage 44 (e.g., hard drive), removable storage 46 (e.g., CD-ROM drive), display adapter 48, sound card 50, transducers 52 (speakers, microphones, and the like), network interface 54, and printer/fax/scanner interface 56. Other computer systems suitable for use with the invention may include additional or fewer subsystems. For example, computer system 20 may include more than one processor 40 (i.e., a multi-processor system) or a cache memory.

The system bus architecture of computer system 20 is represented by arrows 60 in FIG. 2. However, these arrows are only illustrative of one possible interconnection scheme serving to link the subsystems. For example, a local bus may be utilized to connect the central processor 40 to the system memory 42 and display adapter 48. Computer system 20 shown in FIGS. 1 and 2 is only one example of a computer system suitable for use with the invention. Other computer architectures having different configurations of subsystems may also be utilized.

Some of the nodes in a network that employs the present invention may be network devices such as routers and switches. For example, some of the nodes may be specially configured routers such as those available from Cisco Systems, Inc. of San Jose, Calif.

A general architecture for some of these machines will appear from the description given below. In an alternative embodiment, a router or switch may be implemented on a general purpose network host machine such as the computer system of FIGS. 1–2.

Figure 3:
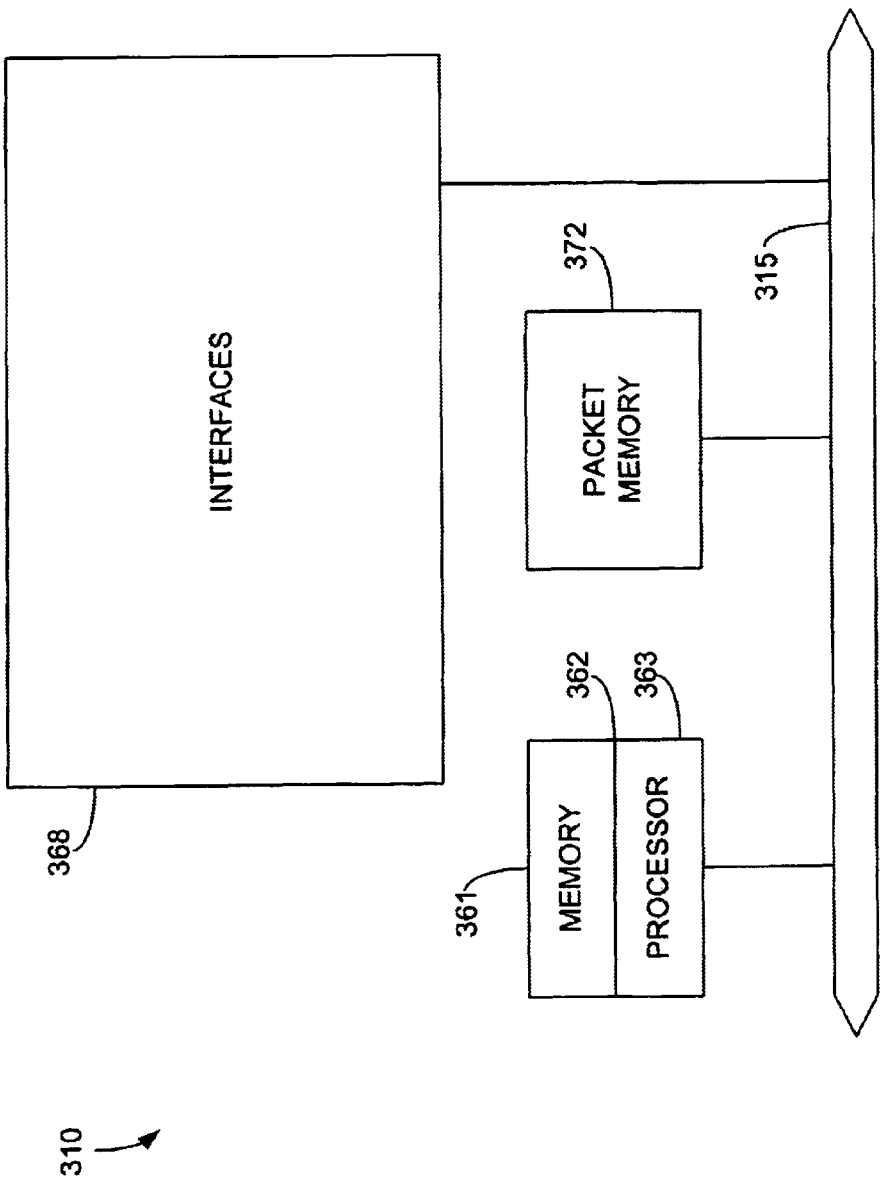
FIG. 3 is a schematic of a router which may represent a network node according to the present invention.

Referring now to FIG. 3, a router 310 suitable for implementing the present invention includes a master central processing unit (CPU) 361, interfaces 368, and a bus 315 (e.g., a PCI bus). As shown, CPU 361 includes a memory 362 and a processor 363. When acting under the control of appropriate software or firmware, CPU 361 is responsible for such router tasks as routing table computations, network management, and general processing of packets. It preferably accomplishes all these functions under the control of software including an operating system (e.g., a version of the Internetwork Operating System (IOS®) of Cisco Systems, Inc.) and any appropriate applications software. CPU 361 may include one or more processors 363 such as a processor from the Motorola family or microprocessors of the MIPS family of microprocessors. In an alternative embodiment, processor 363 is specially designed hardware for controlling the operations of router 310. Memory 362 can be non-volatile RAM and/or ROM. However, there are many different ways in which memory could be coupled to the system.

The interfaces 368 are typically provided as interface cards (sometimes referred to as "line cards"). Generally, they control the sending and receiving of data packets over the network and sometimes support other peripherals used with the router 310. Among the interfaces that may be provided are Ethernet interfaces, frame relay interfaces, cable interfaces, DSL interfaces, token ring interfaces, and the like. In addition, various high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processor may control such communications intensive tasks as packet switching, media control, and management. By providing separate processors for the communications intensive tasks, these interfaces allow the master microprocessor 361 to efficiently perform routing computations, network diagnostics, security functions, etc. Router 310 may further include a packet memory 372 for intermediate storage of packets forwarded by router 310.

Although the system shown in FIG. 3 is one specific router usable in connection with the present invention, it is by no means the only architecture on which the present invention can be implemented. For example, an architecture having a single processor that handles communications as well as routing computations is often used. Further, other types of interfaces and media may also be used with the router.

Regardless of a network device's configuration, it may employ one or more memories or memory modules (including memory 362) configured to store program instructions for the network management operations described herein. The program instructions may control the operation of an operating system or one or more applications, for example. The program instructions and operating system may be stored on any of the media discussed in connection with the computer system of FIGS. 1–2, for example.

Figure 4:
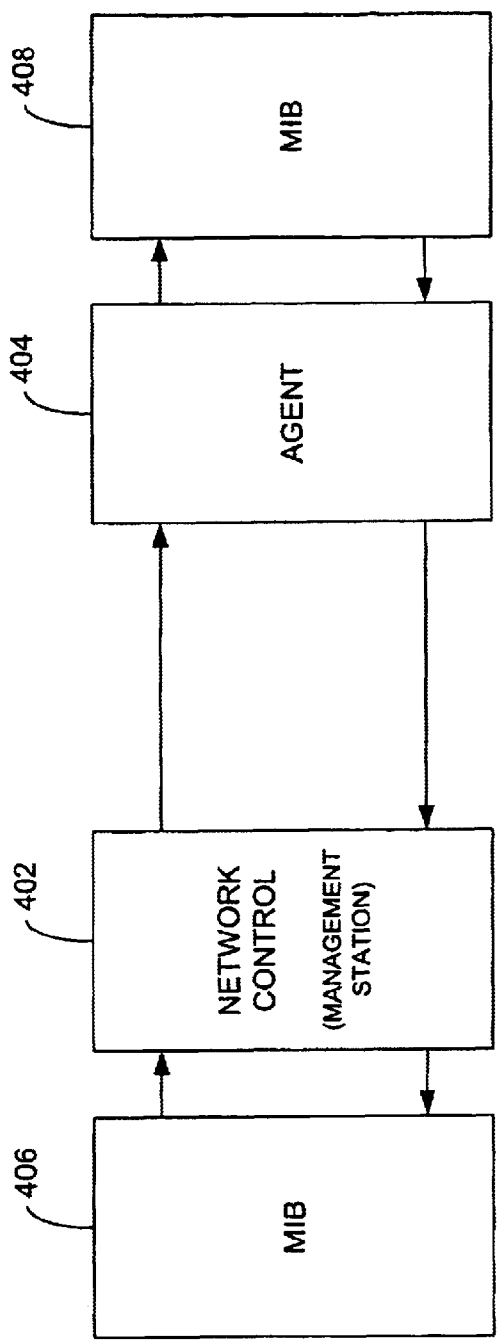
FIG. 4 is a schematic illustrating SNMP operation.

In one embodiment, the present invention operates in conjunction with SNMP which is described in Case, et al., "A Simple Network Management Protocol (SNMP)," RFC 1157, (IETF May 1990), the contents of which are incorporated by reference herein. FIG. 4 generally depicts an SNMP architecture. A network control entity 402 resides on a network management station such as computer system 1. An agent entity 404 resides on another node of the network managed by network control entity 402. For example, agent 404 may be resident on a router such as router 310. Network control entity 402 and agent entity 404 interact according to a protocol defined by SNMP. Network control entity 402 may set system parameters, e.g., TCP/IP parameters at the node occupied by agent entity 404.

There is a Management Information Base (MIB) 406 accessible to network control entity 402 to facilitate managing network information. MIB 406 includes object identifiers (OIDs) that identify objects storing particular pieces of information about network operation. Each object stores a value indicative of network operation at a particular node. An MIB 408 directly accessible to agent entity 404 stores MIB objects for the node of agent entity 404. In MIB 408, each object includes the OID and the object value.

MIB contents are described in McCloghrie, et al., "Management Information Base for Network Management for TCP/IP-Based Internets: MIB-II", (IETF March 1991), the contents of which are incorporated by reference herein. Examples of MIB objects include things such as: the number of outbound packets that could not be transmitted due to errors, the length of the output packet queue, text string indicating the physical location of the node, etc. MIB 406 typically includes only the OIDs for all managed nodes. MIB 408 includes the OIDs and object values. Individual MIB objects are identified by the OIDs. Each OID includes a series of elements with each element being defined by an integer value. Each OID defines an object type.

FIG. 5 depicts four examples of OIDs. For each of the OIDs in FIG. 5, the first element has the value 1 which identifies an overall object identifier domain allocated to the ISO. The second element has the value 3 which is defined as indicating allocation toward an organization under the auspices of the ISO. The third element has the value 6 identifying the US Department of Defense (DOD) as the responsible organization. The fourth element has the value 1 identifying the Internet. Then the fifth element has the value 2 which indicates that the identifier is used for management. The remaining elements identify the particular object types with greater specificity.

Figure 6:
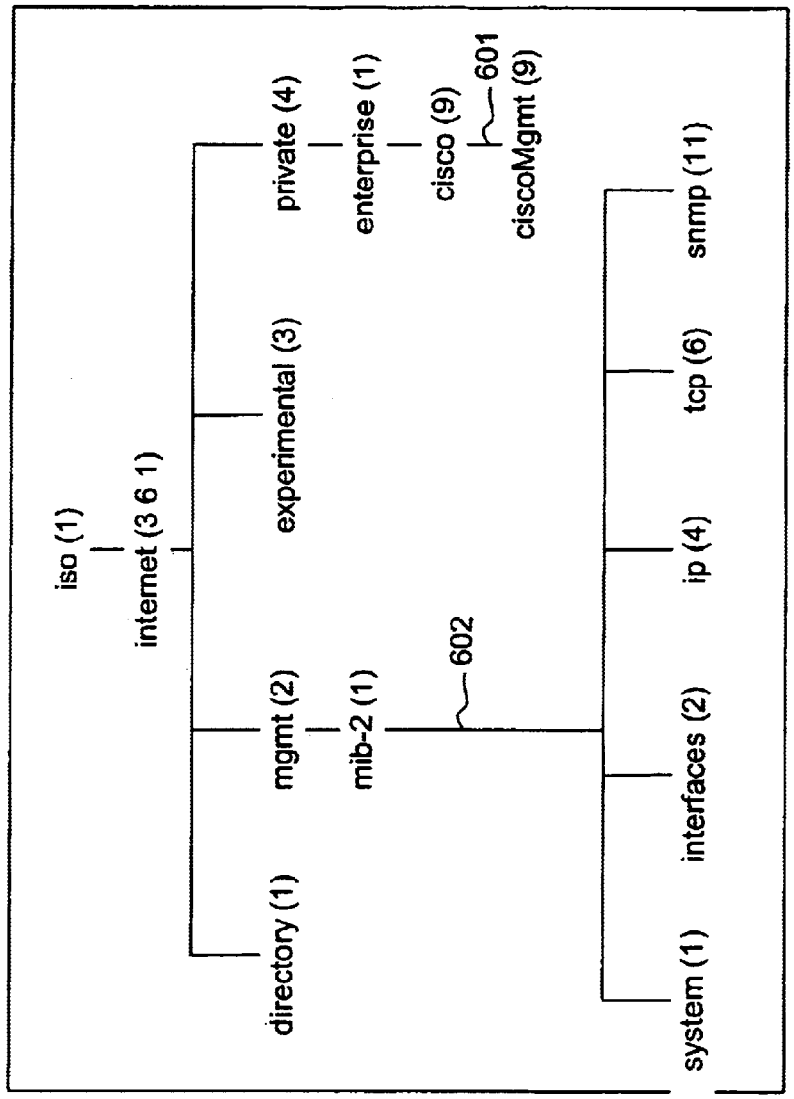
FIG. 6 is a schematic illustrating a portion of a tree structure used to specify MIB object identifiers.

The organization of objects within an MIB may be illustrated as a tree structure. An example of a portion of such a tree structure is illustrated in FIG. 6. The leaves of the tree are the individual objects. FIG. 6 shows the MIB tree from its root, "ISO", to some of its lower branches. A first branch 602 of primary interest includes the standard MIB objects defined by RFC 1213. A second branch 604 includes MIB objects defined for use by Cisco Systems. The illustration of FIG. 6 does not extend down to individual leaves but rather indicates the first series of elements in OIDs for various classes of objects. For example, OIDs from MIB objects pertaining to TCP would begin with 1.3.6.1.2.1.6.

Figure 7:
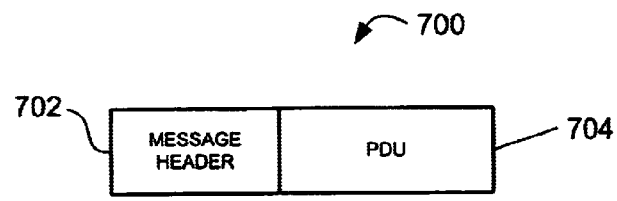
FIG. 7 illustrates the format of an SNMP message.

A typical SNMP operation involves management station 402 sending an SNMP message to agent entity 404 requesting a particular local parameter. Agent entity 404 then recovers this parameter by accessing a particular object in MIB 408 and responds to the request with a reply to management station 402 including the parameter value. Messages 700 sent between the management station 402 and agents 404 contain a message header 702 and a protocol data unit (PDU) 704 (FIG. 7). The message header 702 contains two fields. Version Number and Community Name. The Version Number specifies the version of SNMP used and the Community Name defines an access environment for a group of network management systems. The protocol data unit 704 contains a specific command and operands which indicate the object instances involved in the transaction.

As described above, the SNMP is a request-response protocol. In order for the management station 402 to get information from an agent 404, a Get request is sent to the agent. Conventional Get PDUs follow the lexicographic ordering of the OIDs when retrieving multiple entries within an MIB table. A protocol data unit of the present invention allows the management system to retrieve the contents of a single table entry indexed by a particular element. The new PDU is identified in the following description as GetTableEntry, however, it is to be understood that other names may be used to identify this PDU.

Figure 8:
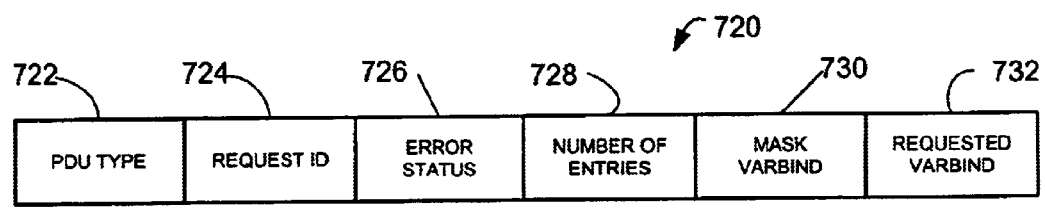
FIG. 8 shows fields of a PDU of the message of FIG. 7.

The format for a GetTableEntry PDU is shown in FIG. 8. The GetTableEntry PDU is constructed using the ASN.1 structure defined in RFC 1157, referenced above. The format of the GetTableEntry PDU is similar to the format of conventional Get PDUs described above, except that it replaces an error index field (used to associate an error with a particular object instance) with a Maximum Number of Entries field and adds a new variable binding field which contains a Mask OID, described below. The PDU Type field 722 identifies the PDU transmitted and may be set equal to five, for example. The Request ID field 724 contains an ID which associates SNMP requests with responses and is used to distinguish among outstanding requests. The Request ID allows an SNMP application entity to correlate incoming responses with outstanding requests. The management station 402 supplies the Request ID and the agent 404 returns the same value. The error status field 726 indicates one of a number of errors and error types. Only the response operation sets the error status field 726. Other operations, such as requests, set this field to zero. The GetTableEntry PDU 720 includes two variable binding fields 730, 732, which serve as data fields for the PDU. The Mask Variable Binding field 730 provides a mask object identifier which is applied to the Requested Variable Binding 732. The Requested Variable Binding field 732 is the same as the variable binding fields included in conventional Get and GetNext PDUs. The term variable refers to an instance of a managed object and variable binding (VarBind) refers to the pairing of the name of a variable to the variable's value. Each requested variable binding associates a particular object identifier with its current value. The management station 402 supplies the Request ID, Number of Entries, Mask Variable Binding, and Requested Variable Binding.

Figure 9:
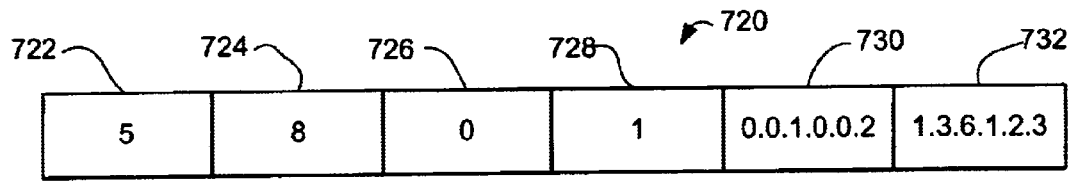
FIG. 9 shows exemplary field values for the PDU of FIG. 8.

An example of a GetTableEntry PDU 720 is shown in FIG. 9. The PDU type (field 722) is 5, which identifies the PDU as a GetTableEntry PDU. The Request ID (field 724) is 8 and the error status (field 726) is set equal to zero, as it is for all request PDUs. The Number of Table Entries to be retrieved is specified in field 728. If this number is zero, then the agent 404 will go through all the valid entries by looking at the mask and requested variable binding in the GetTableEntry PDU, and return them in the Get Response PDU. If the Number of Table Entries is non-zero, the agent 404 will process the mask and Requested Variable Binding fields of the GetTableEntry PDU and fill only the specified number of variable bindings in the Get Response PDU. The Mask Variable Binding (field 730) is equal to 0.0.1.0.0.2. The OID in the Requested Variable Binding field 732 is 1.3.6.1.2.3. The Requested Variable Binding is the OID of the table entry requested by the management station 402. The mask OID is used to identify which element of the requested OID to vary to obtain the requested table entries. The first non-zero value (going from left to right) of the Mask OID (field 730 of FIG. 9) is in the third position and has a value of one. This means that the management station 402 wants the agent 404 to vary the third element of the OID provided in the Requested Variable Binding field 732 (i.e., element having a value of 6 in field 732). Thus, the third element of the Requested Variable Binding will be indexed first and moved through all of its possible values. For example, the third element may be varied to identify the following OID table entries, (assuming the third element has only three additional values within the table):

1.3.7.1.2.3;

1.3.8.1.2.3;

1.3.9.1.2.3.

The next non-zero value of the Mask OID is located at the sixth element position and is equal to two (see field 730 of FIG. 9). The sixth element of the requested OID (field 732) is therefore the second element to be varied. The sixth element of the requested OID is varied for each possible value of the third element varied above. This may yield the following additional table entries, for example:

1.3.6.1.2.4;

1.3.6.1.2.5;

1.3.6.1.2.6;

1.3.7.1.2.4;

1.3.7.1.2.5;

1.3.7.1.2.6;

1.3.8.1.2.4;

1.3.8.1.2.5;

1.3.8.1.2.6;

1.3.9.1.2.4;

1.3.9.1.2.5;

1.3.9.1.2.6.

Figure 10:
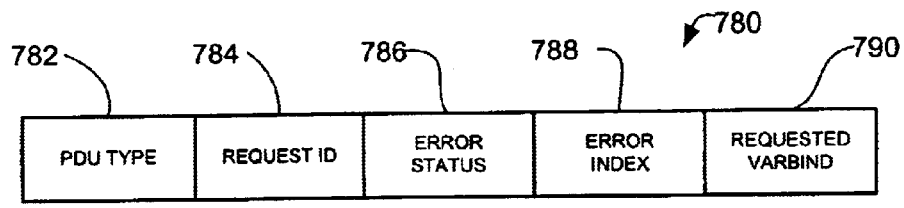
FIG. 10 shows fields of a response message.

The response message 780 for the GetTableEntry PDU has the same format as the conventional SNMP Get Response PDU (FIG. 10). The message includes a PDU Type field 782, Request ID field 784, Error Status field 786, Error Index field 788, and Requested Variable Binding field 790. The PDU Type and Requested ID are the same as provided in the request message 720. If the Error Status is non-zero, the agent 404 returns an Error Index and null values for the Requested Variable Binding. A non-zero Error Index is used to indicate that an exception occurred while processing a request. Since only two variable bindings are specified in the GetTableEntry PDU, and only the second variable binding is the actual requested variable binding, the Error Index will always point to the second variable binding in case of an error.

Figure 11:
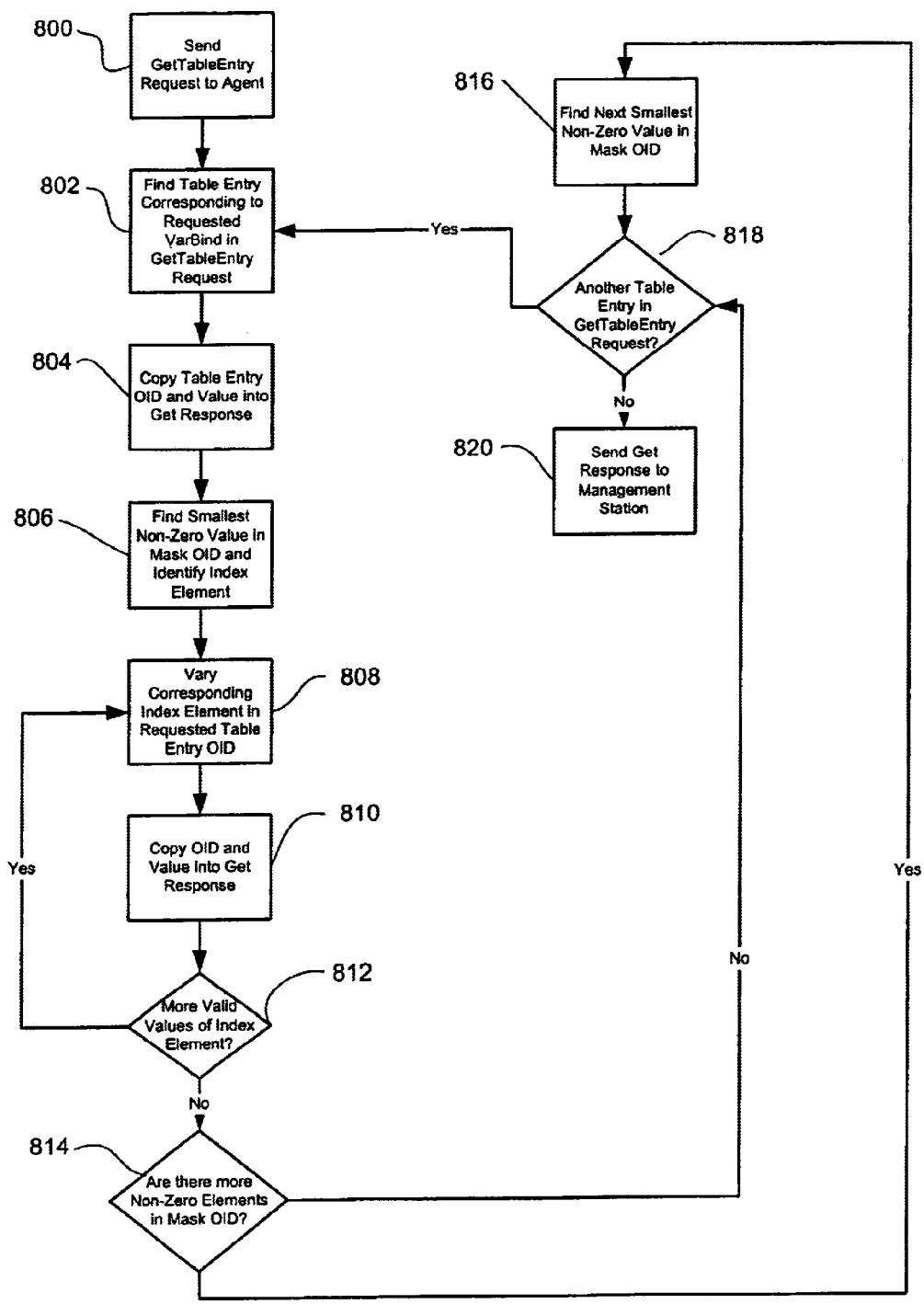
FIG. 11 is a flowchart illustrating a process for retrieving table entries.

FIG. 11 is a flowchart illustrating a process for retrieving elements from a table with the GetTableEntry PDU described above. At step 800 a GetTableEntry request is sent from the management station 402 to an agent 404. The agent 404 first locates the table entry corresponding to the first requested variable binding in the request PDU (step 802). The table entry OID and value are copied into a GetTableEntry response prepared by the agent 404 (step 804). The agent 404 then looks at the Mask OID in the request PDU, finds the smallest non-zero element, and identifies the location of this element in the Mask OID (step 806). The element located within the corresponding position in the requested OID is varied and these additional table entries are copied into the GetTableEntry response (step 810). Steps 808 and 810 are repeated until there are no more valid values within the table for this index element (step 812). The agent 404 then looks again at the Mask OID to see if there is another non-zero element 814. If the Mask contains another non-zero element, the agent 404 identifies the position of the next smallest non-zero element within the Mask OID (step 816). The element in the corresponding position within the requested OID is then varied for all possible values while also varying the first index element (steps 808–812). This is continued for the number of entries specified in the Number of Entries field of the PDU (steps 818–820).

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A computer-implemented method for retrieving a subset of table entries in a in a management information database, the table entries identified by an object identifier having a plurality of elements, the method comprising:

receiving a request for only a subset of table entries of a table contained in a management information base, the request including at least one table entry object identifier and an index identifying said at least one element thereof, the object identifier and the index identifying the subset of table entries requested;

varying the index element in the table entry object identifier upon receiving the request to obtain the requested subset of table entries;

generating in response containing said subset of table entries indexed by said at least one element; and sending the response including the subset of table entries obtained by varying the index element;

wherein receiving a request comprises receiving a mask object identifier having a number of elements corresponding to the number of elements within the table entry object identifier at least one of the elements of the mask object identifier being non-zero and identifying the index element.

2. The method of claim 1 wherein said object identifier comprises an SNMP MIB object identifier.

3. The method of claim 1 wherein the mask object identifier comprises a second index element.

4. A computer program product for retrieving table entries in a management information database, the table entries identified by an object identifier having a plurality of elements, the product comprising:

code that receives a request for a subset of table entries in a management information base, the request including at least one table entry object identifier and an index identifying at least one of said plurality of elements;

code that varies the index element in the table entry object identifier to obtain requested table entries;

code that generates a response containing said subset of table entries indexed by said at least one element;

code that sends the response including table entries obtained by varying the index element;

code that receives a mask object identifier having a number of elements corresponding to the number of elements within the table entry object identifier, at least one of the elements of the mask object identifier being non-zero and identifying the index element; and a computer-readable storage medium for storing the codes.

5. The computer program product of claim 4 wherein the computer readable medium is selected from the group consisting of CD-ROM, floppy disk, tape, flash memory, system memory, hard drive, and data signal embodied in a carrier wave.

6. The Computer program product of claim 4 wherein said object identifier comprises an SNMP MIB object identifier.

7. A computer system comprising:

a processor that executes a program for retrieving table entries identified by an object identifier having a plurality of elements, said program comprising:

code that receives a request for a subset of table entries in a management information base, the request including at least one table entry object identifier and an index identifying at least one element thereof;

code that varies the index element in the table entry object identifier to obtain requested table entries;

code that generates a response containing said subset of table entries indexed by said at least one element;

code that sends the response including table entries obtained by varying the index element;

code that receives a mask object identifier having a number of elements corresponding to the number elements within the table entry object identifier, at least one of the elements of the mask object identifier being non-zero and identifying the index element; and a computer-readable storage medium having said program stored thereon.

8. The computer system of claim 7 wherein said object identifier comprises an SNMP MIB object identifier.

9. The computer system of 7 claim wherein the mask object identifier comprises a second index element identifying a second of said plurality of elements to vary.

10. The method of claim 1 wherein the request is a get request.

11. The method of claim 1 wherein the subset of table entries contains only table entries indexed by said at least one index element.

12. The method of claim 1 wherein the request comprises a PDU containing the number of table entries to be included in the subset.

13. The method of claim 1 wherein said at least one table entry object identifier is a variable binding identifying an OID of a table entry requested by a management station.

14. The method of claim 13 wherein the index element is a mask OID.

15. The method of claim 1 wherein varying the index element comprises moving the element identified by the index element through all of its possible values to obtain the requested table entries.

* * * * *